United States Patent [19]

O'Toole

[11] 3,780,219

[45] Dec. 18, 1973

[54] SIGNAL PROCESSING CIRCUIT

[75] Inventor: John J. O'Toole, Scottsdale, Ariz.

[73] Assignee: Motorola, Inc., Franklin Park, Ill.

[22] Filed: June 1, 1972

[21] Appl. No.: 258,846

[52] U.S. Cl.. 178/5.4 HE, 178/5.4 AC, 178/5.4 SY

[51] Int. Cl. .......................... H04n 9/44, H04n 9/48

[58] Field of Search ................ 330/30 D; 178/5.4 R, 178/5.4 AC, 5.4 SY, 5.4 HE

[56] References Cited

UNITED STATES PATENTS

| | | | |
|---|---|---|---|
| 3,262,066 | 7/1966 | Trilling | 330/30 D |
| 3,290,520 | 12/1966 | Wennik | 330/30 D |
| 3,292,098 | 12/1966 | Bensing | 330/30 D |
| 3,395,358 | 7/1968 | Petersen | 330/30 D |
| 3,493,879 | 2/1970 | Stanley | 330/30 D |
| 3,585,285 | 6/1971 | Rennick | 178/5.4 SY |
| 3,626,089 | 12/1971 | Cecchin | 178/5.4 AC |

*Primary Examiner*—Robert L. Richardson
*Attorney*—Foorman L. Mueller et al.

[57] ABSTRACT

A color television receiver has an integrated circuit burst amplifier and hue control, voltage controlled subcarrier oscillator, APC detector and ACC detector. Simplified filtering and adjustment of the components on the integrated circuit minimizes the bonding pads required for the circuit and reduces the number of external components normally required.

20 Claims, 3 Drawing Figures

SIGNAL PROCESSING CIRCUIT

BACKGROUND OF THE INVENTION

The standard NTSC color television signal is comprised of a brightness signal component transmitted on an amplitude modulated video carrier; a color information signal component transmitted on a phase and amplitude modulated subcarrier to represent hue and saturation, respectively; a burst signal component, synchronized with the color information subcarrier; and synchronizing signal components.

In a color television receiver, separate channels to the demodulator are provided for the brightness and color components. The burst signal is separated from the remainder of the composite signal to provide a reference signal used for controlling the synchronous demodulation of the demodulated color component. Because the saturation of the colors in the image produced by the receiver is dependent upon the ratio of the amplitudes of the color subcarrier wave and the brightness signal component, it has been found desirable to utilize a separate or selected gain control of the color processing channel in addition to any automatic gain control of the type which is employed in a conventional black and white television receiver.

Since the amplitude of the burst component bears a direct relationship to the amplitude of the color information component of the composite signal and the burst signal component is present only when color information is being transmitted, a selective automatic gain control circuit for the chrominance or color channel often is derived from the presence of the predetermined amplitude of the burst component. This selective gain control function for the color or chroma processing channel is designated as the "automatic chroma control" (ACC) function.

To adjust the hue of the image viewed on the screen of the cathode ray tube of a color television receiver, it is a common practice to provide a circuit for shifting the relative phases of the incoming color subcarrier and a locally generated subcarrier reference signal which is utilized to demodulate the color subcarrier. By adjusting the relative phases of these signals, it is possible for the viewer of the television receiver to adjust the hues of the reproduced images to suit his individual preferences. Control of the selected or desired relationship between the color subcarrier signal and the subcarrier reference signal is effected by synchronizing the subcarrier oscillator in phase and frequency with the received burst signal components. This can be accomplished by use of an automatic phase control (APC) detector in the feedback loop of the oscillator and responsive to the oscillator output and the burst signal components.

Integrated circuit techniques permit substantial reduction in the size of the different signal processing circuits present in a color television receiver; and the reference oscillator, hue control, APC and ACC portions of the receiver have been reduced to integrated circuit form. Although these functions have been provided in integrated circuit form, such integrated circuits generally require a number of bonding pads or pins to which external phase shift networks are connected in order to provide the necessary phase shifts required by these circuit functions and to provide control of these phase shifts. Such external phase shift circuits generally require capacitors and inductors which increase the expense and complexity of the television receiver in which such integrated circuits are used.

At the present time, it is not possible to include inductors on an integrated circuit chip as a practical matter. Thus, it is desirable to provide an integrated circuit including the subcarrier oscillator, APC, and ACC circuits which includes the necessary phase shifting networks on the integrated circuit chip itself, thereby minimizing the number of bonding pads or output pins required and eliminating the necessity for the use of external coils in phase shifting networks.

SUMMARY OF THE INVENTION

Accordingly it is an object of this invention to provide an improved signal processing circuit.

It is another object of this invention to provide an improved gated burst amplifier and hue control circuit for a color television receiver.

It is an additional object of this invention to provide an improved oscillator circuit.

It is yet another object of this invention to provide an improved integrated signal processing circuit for use as a subcarrier regeneration circuit in a color television receiver.

In accordance with a preferred embodiment of this invention, a signal processing circuit for supplying an output signal which has a predetermined phase relationship with an input signal includes a first differential amplifier having first and second amplifier devices. An input signal is applied to the control electrode of at least one of these amplifying devices, and at least one additional differential amplifier having third and fourth amplifier devices is supplied with signals from one of the first and second amplifier devices on common electrodes of both of the third and fourth amplifier devices. A capacitor is coupled across the output electrodes of one of the third and fourth amplifying devices and the other of the first and second amplifying devices, and a direct current control signal is coupled to the control electrode of at least one of the third and fourth amplifier devices to vary the relative gains of the third and fourth devices. This causes signals obtained from the output of the additional differential amplifier to have an adjustable phase relationship with the input signals applied to the first differential amplifier as determined by the relative gains of the third and fourth amplifier devices.

In a more specific embodiment of the invention, an oscillator is formed by feeding the output signals obtained from the additional differential amplifier through a frequency determining network to form the input signals for the first differential amplifier. The control signals for varying the relative gains of the amplifier devices in the additional differential amplifier then can be obtained from an automatic phase control detector or comparator supplied with reference signals and the output signal from the oscillator, so that the operation of the oscillator is synchronized with the reference signals.

BRIEF DESCRIPTION OF THE DRAWING

FIGS. 1 and 2 of the drawing comprise a schematic diagram, partially in block form, of a color television receiver employing a signal processing circuit in accordance with a preferred embodiment of the invention; and FIG. 3 illustrates the manner in which FIGS. 1 and 2 are placed together to form the complete circuit diagram.

DETAILED DESCRIPTION

Figure 1:
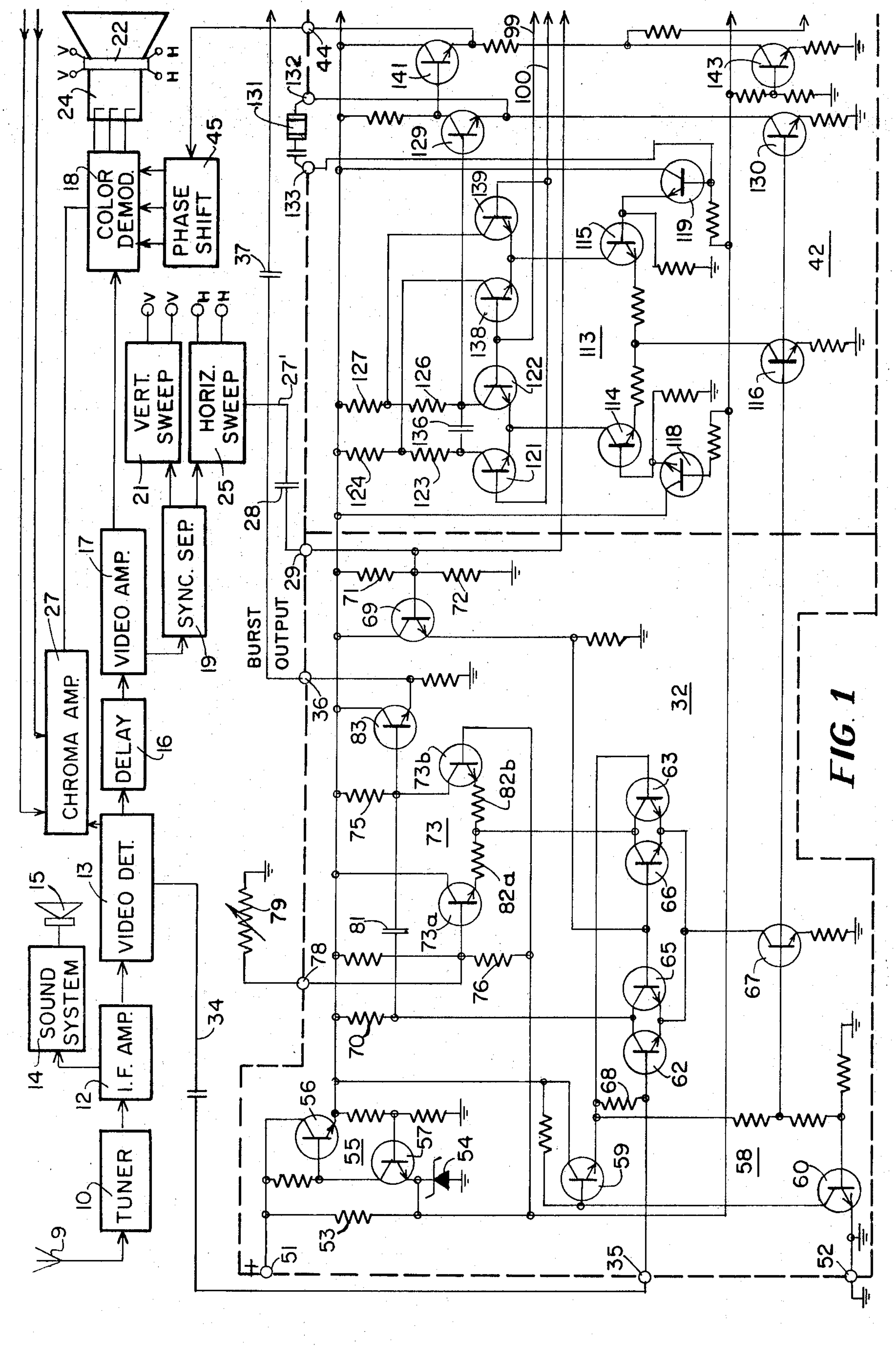
Figures 2, 3:
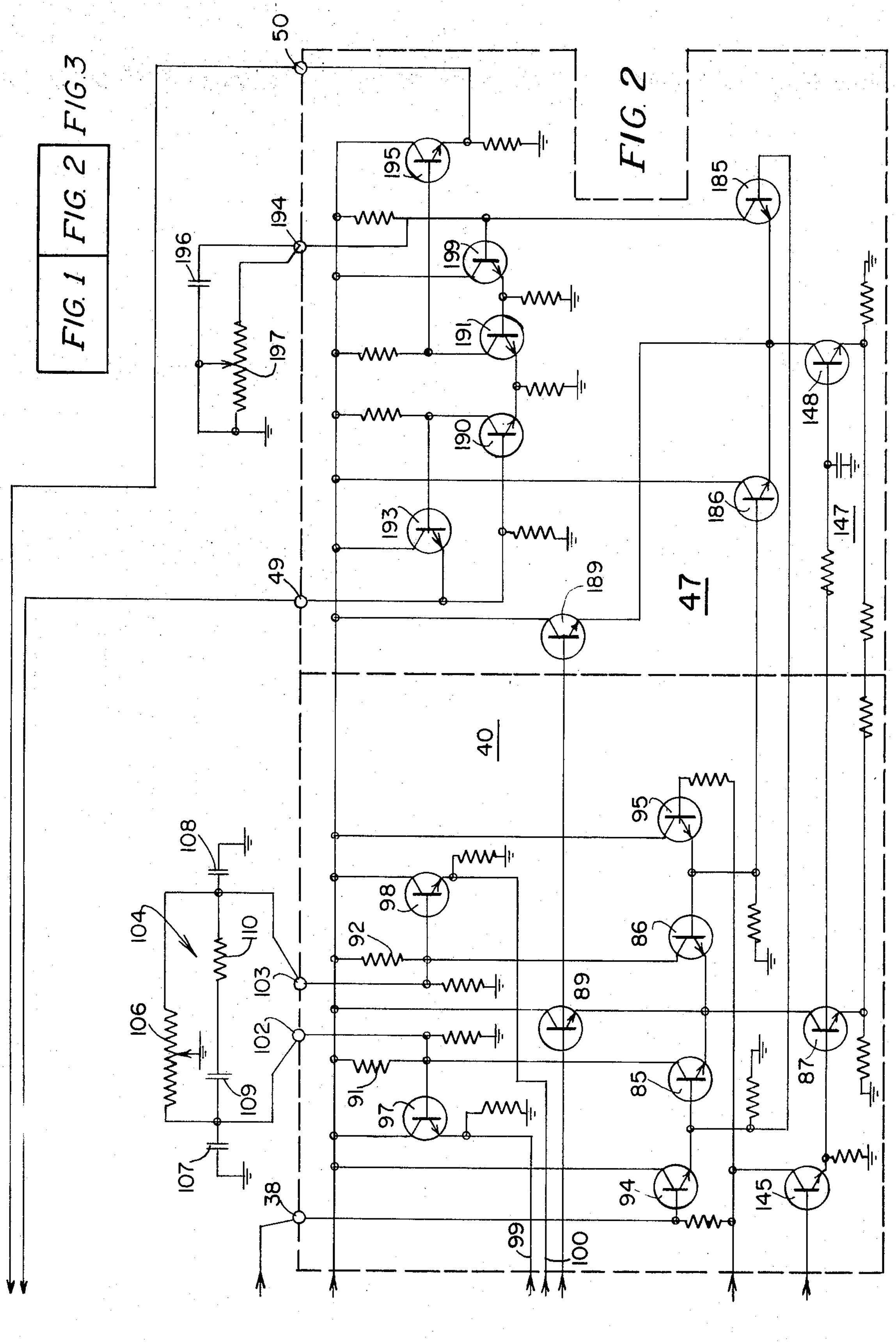

Referring now to the drawing, there is shown a color television receiver in which the portion of the circuit shown enclosed within dotted lines comprises a signal processing circuit for generating the subcarrier reference signal. This portion of the circuit preferably is formed as a single monolithic integrated circuit with all of the components included within the dotted lines being formed as part of the integrated circuit.

Transmitted television signals are received by the television receiver in the drawing on an antenna 9 which supplies input signals to a tuner 10 which may include, for example, RF stages of the receiver as well as a first detector or mixer and an associated local oscillator. The output intermediate frequency developed by the tuner 10 is coupled through an intermediate frequency amplifier 12 to a video detector 13. The output of the intermediate frequency amplifier 12 also is supplied to a sound system 14 which supplies amplified audio signals to a loudspeaker 15. Brightness signal components in the detected composite video signal are delayed in a delay circuit 16, for purposes well known to those skilled in the art, and are applied to a video amplifier 17, the output of which is supplied to a color demodulator circuit 18 illustrated as a "direct" color demodulator circuit.

The composite color television signal has video information components with a blanking interval recurring at the horizontal rate of 15,734 hertz. A horizontal synchronizing pulse appears at the beginning of each blanking interval immediately followed by a burst signal component. A vertical synchronizing pulse also appears in the composite video signal at a 60 hertz rate and is separated from the remainder of the composite signal in a synchronizing pulse separator circuit 19. The separated vertical synchronizing pulses then are applied to a vertical sweep system 21 which develops a vertical sawtooth signal V—V in vertical deflection windings placed on a deflection yoke 22 on the neck of the cathode ray tube 24 of the color television receiver. The horizontal synchronizing pulses also are separated from the remainder of the composite signal in the pulse separator circuit 19 and are applied to a horizontal sweep system 25 which develops horizontal sweep signals H-H in horizontal deflection windings on the deflection yoke 22.

The horizontal sweep circuit 25 also generates a flyback or retrace pulse which appears on a lead 27' as a negative-going horizontal gate pulse coupled through a coupling capacitor 28 to a bonding pad 29 on an integrated signal processing circuit 30. The negative horizontal gate pulse occurs in time coincidence with the reception of the burst signal components in the composite signal, and is used in the signal processing circuit 30 to operate a gated burst amplifier and hue control circuit 32 forming part of the processing circuit 30.

The composite signal obtained from the video detector 13 also is supplied to a chroma amplifier circuit 27, the output of which supplies the modulated color subcarrier signal to the color demodulator 18. Another output from the video detector is capacitor coupled over a lead 34 to a bonding pad 35 of the signal processing circuit 30 and comprises the output signal applied to the gated burst amplifier and DC hue control circuit 32. The circuit 32 is rendered operative by the horizontal gate pulse only during receipt of the burst signal components and supplies burst signal components at an adjustable phase relative to the phase of the burst components in the received signal to an output bonding pad 36. A coupling capacitor 37 connects the bonding pad 36 to another bonding pad 38 to apply the burst signal components as one of the input signals to an automatic phase control (APC) detector circuit 40 forming a portion of the signal processing circuit 30.

The signal processing circuit 30 also includes a voltage controlled oscillator 42 which supplies signals to the APC detector 40 employed in a phase lock loop to synchronize the operation of the oscillator 42 with the burst signal components. The oscillator output signals also are applied to an output bonding pad 44 at the desired phase relative to the received burst component. The signals appearing on the bonding pad 44 are the subcarrier reference signals applied to a phase shift circuit 45 which produces three phases of color reference signals. The color demodulator circuit 18 uses these reference signals to produce the red, blue and green color signals needed to drive the cathodes of the color cathode ray tube 24.

The signal processing circuit 30 also includes an ACC detector circuit portion 47 which is responsive to the magnitude of the burst signal component to produce a differential direct current gain control voltage on a pair of output bonding pads 49 and 50. This differential control voltage is applied to the chroma amplifier 27 to control the gain thereof in a known manner.

As stated previously, the gated burst amplifier and DC hue control circuit 32, the APC detector 40, the voltage controlled oscillator 42, and the ACC detector 47 all are formed as a part of a single integrated circuit 30. Preferably the circuit 30 is a monolithic integrated circuit and it may be an independent chip or part of a larger integrated circuit chip including other portions of the signal processing circuitry of the television receiver, such as the chroma amplifier, if desired.

Referring now to the signal processing circuit 30 in detail, a positive direct current operating potential is applied to the integrated circuit 30 on a bonding pad 51 which comprises one of the voltage supply terminals for the circuit 30. Ground potential is applied to the chip through a bonding pad 52 which may be considered as the other voltage supply terminal for the circuit 30. The various stabilized DC operating potentials for providing various levels of direct current potentials necessary to operate the remainder of the circuit 30 are obtained from a regulated reference and supply circuit including a first voltage divider in the form of a resistor 53 connected in series with a zener diode 54 between the bonding pad 51 and ground. In addition, a feedback amplifier 55 including a pair of transistors 56 and 57 (NPN) is provided. The negative temperature coefficient of the amplifier 55 is compensated by the positive temperature coefficient of the zener diode 54, and a low direct current impedance is present at the emitters of the transistors 56 and 57 which permits the use of the direct current potential appearing on the emitter of the transistor 56 as a regulated DC supply voltage for the remainder of the circuit 30, while permitting low impedance reference voltage to be obtained from the junction of the emitter of the transistor 57 with the zener diode 54 and further to be obtained from an additional feedback amplifier 58 including a pair of NPN transistors 59 and 60 connected between the emitter of the transistor 56 and ground. Other types of direct current supply circuits could be utilized, but the circuit shown provides good temperature compensation and effectively isolates the direct current supply on the bonding pad 51 from the subcarrier modulation signals.

The gated burst amplifier and direct current hue control circuit 32 has an input stage formed of two differential amplifiers, the first of which comprises a pair of NPN transistors 62, 63 and the second of which comprises a pair of NPN transistors 65 and 66. The collector-emitter paths of the transistors 62 and 65 are connected in parallel as are the collector-emitter paths of the transistors 63 and 66. The transistors of both of these differential amplifiers time share a common direct current sink supplied by an NPN current source transistor 67, the base of which is provided with operating potential from a voltage divider connected to the emitter of the transistor 59. Direct current operating bias potential also is applied from the emitter of the transistor 59 to the bases of the transistors 63 and 62, and an isolating resistor 68 is coupled between the bases of these transistors. This permits the composite signals applied to the bonding pad 35 and connected to the base of the transistor 62 to cause an amplified push-pull signal to be generated in the output collectors of the transistors 62 and 63 whenever the transistors 65 and 66 are nonconductive.

At all times except during the burst interval, the transistors 65 and 66 are rendered conductive by the application to the bases of these transistors of a relatively high positive direct current biasing potential from the emitter of an NPN gating transistor 69, normally rendered conductive by the potential applied to its base through a resistor divider 71 and 72. When the transistors 65 and 66 are conductive, the transistors 62 and 63 are nonconductive. Therefore, the signals appearing on the bases of the transistors 62 and 63 are ineffective. In this state of operation, the current provided by the current sink transistor 67 is divided between the transistors 65 and 66 of the shunt gate formed by these transistors; so that the currents on the collectors of the transistors 65 and 66 merely comprise steady state DC currents.

When the negative horizontal gate pulse obtained from the horizontal sweep circuit 25 is applied to the bonding pad 29 coupled to the base of the transistor 69, the transistor 69 is rendered nonconductive. This in turn causes substantially ground potential to be applied to the bases of the transistors 65 and 66, rendering these transistors non-conductive. During the interval of this negative horizontal gate pulse the transistors 62 and 63 then are operative to respond to the signals appearing on the input bonding pad 35. Since the horizontal gating pulse occurs in time coincidence with the burst interval, the signals appearing on the collectors of the transistors 62 and 63 then comprise the amplified push-pull burst signal.

The collector of the transistor 62 drives a constant load impedance 70, while the collector of the transistor 63 is coupled to the emitters of a pair of NPN transistors 73*a* and 73*b* connected as a differential gain control amplifier 73. The collector of the transistor 73*b* is connected through a load impedance 75 to the source of operating potential on the emitter of the transistor 56, and the collector of the transistor 73*a* is connected to the emitter of the transistor 56. The value of resistance of the resistor 70 is chosen to be twice the value of resistance of the resistor 75. Thus, when the transistors of the differential amplifier 73 are equally conductive and when the transistor 62 and 63 or 65 and 66 of the input differential amplifiers also are equally conductive, the potentials appearing on the lower ends of the resistors 70 and 75 also are equal. When the differential transistors 62 and 63 supply the amplified burst signal, the potentials on the lower ends of the resistors are of equal amplitude but of opposite phase (antiphase) when the bases of the transistors 73*a* and 73*b* are at the same direct current potential.

Gain control of the differential amplifier 73 is obtained by connecting a resistor 76 between the emitter of the reference transistor 57 and the base of the transistor 73*a* and further connecting the base of the transistor 73*a* to a gain control bonding pad 78 which is coupled through a variable DC hue control resistor or potentiometer 79 to ground. The setting of the hue control resistor 79 may be varied manually to determine the emitter current sharing between the transistors 73*a* and 73*b* by varying the potential on the base of the transistor 73*a* relative to the fixed potential on the base of the transistor 73*b*. A capacitor 81 is connected across the lower ends of the resistors 70 and 75 (and therefore across the collectors of the transistors 73*b* and 62, 65) to shift the burst plate at the collector of the transistor 72 by 90° when the burst amplitude across the resistors 70 and 75 is equal and 180° out-of-phase. The DC hue control range is centered for this case in order that tha quadrature locked offset of the APC detector 40 will result in a B–Y phased reference signal output from the oscillator, where Y is the monochrome signal and B is the blue signal of the standard NTSC composite television signal.

A pair of resistors 82*a* and 82*b* are connected to the emitter of the transistors 73*a* and 73*b* to minimize gain and phase variations of the transistors 73*b* due to ambient temperature variations. These resistors also limit the phase range of the potentiometer to about ±50°, but this is sufficient range for effective hue control; the resistors 82*a* and 82*b* also help linearize gain control.

The gated burst output waveform is obtained from the collector of the transistor 73*b* and is coupled through an NPN emitter follower isolation transistor 83 to the bonding pad 36 where it is coupled through the coupling capacitor 37 to the bonding pad 38 to form one of the two inputs to the APC detector circuit 40.

To cause the subcarrier reference signal generated by the oscillator circuit 42 to be synchronized to the NTSC burst signal components, the APC detector circuit 40 compares the phase and frequency of the oscillator output with the burst components and introduces variable degrees of phase shift in the oscillator feedback loop in accordance with the results of this comparison. The APC detector circuit 40 best is described as a gated balanced differential product detector formed by a pair of NPN transistors 85 and 86 which time share a common current sink, provided by an NPN transistor 87, with a cascode-connected common-collector gated amplifier transistor 89. The collectors of the transistors 85 and 86 are connected through corresponding load resistors 91 and 92 to the emitter of the supply voltage transistor 56.

Direct current operating potential and input signals are applied to the base of the transistors 85 and 86 through NPN emitter follower transistors 94 and 95, the bases of which are provided with a direct current reference voltage form the junction of the emitter of the transistor 57 with the zener diode 54. The base of the transistor 94 further is supplied with the burst signal components on the bonding pad 38. At all times except during the burst interval, the transistor 89 is rendered conductive by the potential supplied to the base thereof from the voltage divider 71, 72. This causes the transistors 85 and 86 to be reversed biased to their off condition, rendering the APC detector nonresponsive to the input signals applied to it. Thus, the oscillator output signals applied to the base of the transistor 87 are shunted or bypassed to the DC supply by the conductive transistor gate 89.

The negative horizontal gate pulse applied to the bonding pad 29 during the burst interval of the received signal to render the transistor 69 nonconductive also renders the transistor 89 nonconductive. With the transistor 89 non-conductive, the APC detector circuit 40 responds to the subcarrier oscillator signal applied by the transistor 87 common mode to the emitters of the differential transistors 85 and 86 and also responds to the burst signal components applied to the bases of the transistors 85 and 86 by way of the emitter-follower transistors 94 and 95 respectively. The APC circuit then operates as a balanced push-pull product detector and provides a differential direct current control signal on the collectors of the transistors 85 and 86. This differential direct current control signal is supplied through a pair of NPN emitter-follower transistors 97 and 98 to a pair of control leads 99 and 100 respectively. The control signals appearing on these leads are used to control the free running oscillator frequency and to balance any DC offset which exists inside the oscillator feedback loop of the voltage controlled oscillator 42.

A pair of bonding pads 102 and 103 are connected to the collectors of the transistors 85 and 86, and a balance adjustment and filter circuit 104 is connected between these two bonding pads. The circuit 104 includes a direct current offset potentiometer 106, the tap of which is connected to ground. Adjustment of the positions of the tap on the potentiometer 106 is employed to balance the direct current offset inside the feedback loop of the oscillator 42 and to set the free running oscillator frequency. In addition, a pair of filter capacitors 107 and 108 are connected between the bonding pads 102 and 103, respectively, and ground to eliminate ripples and signals at the subcarrier frequency from the outputs of the phase detector. A capacitor 109 connected in series with a resistor 110 between the bonding pads 102 and 103 forms an integral noise bandwidth filter for the APC loop.

As stated previously, the differential output voltage obtained from the APC detector circuit 40 is used to control the phase and frequency of a voltage controlled oscillator 42. The oscillator is a free running oscillator with a differential input stage 113 including a pair of NPN transistors 114 and 115. The emitters of these transistors are coupled together to an NPN current source 116, and the bases of the transistors 114 and 115 are supplied with DC bias potential from the zener diode 54 through a pair of NPN isolation transistors 118 and 119, respectively. The collector of the transistor 114 drives the emitters of a common mode differential pair of NPN transistors 121 and 122, each of which have identical collector load resistors 123, 124 and 126, 127, respectively. Output signals on the collector of the transistor 122 are coupled to the base of an output transistor 129, the emitter of which is supplied with current from an NPN current source transistor 130 and which also is connected in a feedback loop through a quartz crystal 131 located externally of the circuit 30 and connected between a pair of bonding pads 132 and 133. The bonding pad 133 in turn is connected to the base of the transistor 119 to complete the feedback loop of a circuit which oscillates at the crystal series resonant frequency. A common-mode equal-amplitude waveform would appear on the collectors of the transistors 121 and 122 for the portion of the circuit thus described in the absence of the other components of the oscillator 42 shown in the drawing.

To permit adjustment of the phase and frequency of operation of the oscillator, a capacitor 136 is connected across the collectors of the transistors 121 and 122; and a second common-mode differential pair of transistors 138 and 139 are driven by the collector of the transistor 115 in phase opposition (anti-phase) to the transistors 121 and 122. The transistors 138 and 139 share a part of the common collector load impedance, the resistors 124 and 127, respectively, with the transistors 121 and 122. Under balanced conditions of operation, the collector currents of the transistors 121 and 122 are equal and opposite in phase to the collector currents of the transistors 138 and 139. Thus, for balanced operation, the opposing collector currents matrixed in the resistors 124 and 127 cancel, with the equivalent oscillator circuit being one in which only the transistors 121 and 122 are effective.

Connection of the capacitor 136 between the collectors of the transistors 121 and 122 such that the reactance thereof is equal to the sum of the resistors 123 and 124 or 126 and 127, does not alter either the phase or the frequency response of the circuit so long as the capacitor is driven by a common mode alternating current waveform. If, however, the voltage waveforms at the collectors of the transistors 121 and 122 are of equal amplitude but 180° out-of-phase, the addition of the capacitor 136 theoretically shifts the phase angle by ±90°. Thus, modification of the balanced current relationship between the transistors 121, 122 and 138, 139 by applying a DC switching voltage to the two base pairs (121, 139 and 122, 138) causes a waveform inversion in the alternating current signals appearing at the collectors of the transistors 121 and 122. This in turn results in a theoretical range of phase control or phase shift of the output waveform with respect to the signals applied to the input differential amplifier 113 of ±90°.

In the practical realization of the oscillator 42, however, the negative phase feedback current supplied by the anti-phase differential transistor pair 138 and 139 is tapped down on the common resistor matrix of the resistors 123, 124, 126 and 127 to insure sufficient positive feedback loop gain to sustain oscillation when the system is in balance. For this reason, the maximum theoretical phase shift of ±90° is not realized. In a circuit which has been operated, the resistors 124 and 127 have been selected to have equal resistance of a value which is approximately two-thirds the value of equal resistance of the resistors 123 and 126. This results in a total practical oscillator phase shift range of 135° (±67½°). Beyond this range, the phase slope of the phase delay plotted against the crustal response becomes fairly flat, so that very little frequency pull capability exists outside of the range. The particular oscillator tap down ratio of the resistors 123, 124 and 126, 127 is selected as a compromise between the maximum oscillator frequency control range and adequate open loop gain margin to sustain oscillation.

The operation of the voltage controlled oscillator circuit 42 is such that the circuit has more loop gain when it is out of balance than when it is in balance. As a consequence, increased loop gain tends to compensate for the increased impedance of the crystal 131 when the oscillator is operating at frequencies which are off the resonant frequency of the crystal. On the other hand, the lowest loop gain exists for a balanced condition when the oscillator is operating at the resonant frequency of the crystal; and it is at this frequency that the impedance of the crystal is at its lowest. Thus, the optimum operation of the oscillator exists.

To provide the control voltage which adjusts the phase and frequency of the oscillator to lock it in phase and frequency with the received burst signal component, the differential direct current control voltages on the leads 99 and 100 from the APC detector circuit 40 are connected, respectively, to the common junctions of the bases of the transistors 122, 128 and 121, 139. For a balanced condition of operation, indicating that the operation of the oscillator is synchronized in phase and frequency with the burst signal components, the potentials on the leads 99 and 100 are equal, and the balanced oscillator operation described above occurs. Variations from phase and frequency synchronization of the oscillator output with the burst signal on the bonding pad 38 produce a differential control voltage on the leads 99 and 100 in a sense to cause the operation of the oscillator to shift in a direction to pull the oscillator into phase and frequency synchronization with the burst signal. It should be noted that this is accomplished without any external phase shift components for the oscillator. The capacitor 136 is formed as part of the oscillator on the integrated signal processing circuit chip 30 itself.

The only bonding pads from the oscillator which are required are those necessary to couple the crystal 131 into the feedback loop and to provide the output from the oscillator on the bonding pad 44 for the phase-shift circuit 45. This output is supplied by an emitter follower amplifier transistor 141 driven by the collector of the transistor 129 and having its emitter coupled to an NPN current source transistor 143. The oscillator output signals are at the (B–Y) phase and also are coupled to the base of an emitter-follower driver transistor 145, which in turn supplies the oscillator output signal to the base of the transistor 87 in the APC detector circuit.

The oscillator output signal also is applied from the emitter of the transistor 145 through a 45° RC phase shift circuit 147 to the base of a current source NPN input transistor 148 in the ACC detector circuit 47. The ACC phase detector circuit is similar in may respects to the APC detector circuit 40 in that the gating and product detector circuit portions are identical. The basic output of the ACC circuit 47, however, is derived as a single ended signal in contrast with the differential output of the APC circuit 40. This is done to eliminate the need for an additional integrated circuit bonding pad in generating the push-pull output signal. The ACC circuit 47 comprises a pair of differentially connected input transistors 185 and 186 corresponding, respectively, to the transistors 85 and 86 of the APC circuit. A burst gate transistor 189, comparable in function and operation to the transistor 89 in the APC circuit, disables operation of the ACC detector circuit at all times except when the negative horizontal gate pulse is applied to the bonding pad 29. This pulse is applied to the base of the transistor 189 simultaneously with its application to the base of the transistor 89.

The anti-phase output signal for the ACC detector circuit 47 is derived internally on the chip of the integrated processing circuit by the use of a unity gain differential direct current amplifier consisting of a pair of NPN transistors 190 and 191, the emitters of which are connected through a common emitter resistor 192 to ground. Collector-to-base feedback of the transistor 190 is accomplished by an NPN emitter follower transistor 193. This transistor provides 100 percent negative feedback for the circuit. The anti-phase output signal is obtained from the collector of the transistor 191 and is supplied to an isolation emitter follower transistor 195. The emitters of the transistors 193 and 195 thus provide a differential direct current chroma AGC output voltage on a pair of bonding pads 49 and 50, which are connected to the chroma amplifier 29 to control the gain thereof in accordance with the magnitude of the burst signal component applied to the bases of the transistors 185 and 186.

A single external bonding pad 194 is used to bypass the output alternating current waveform through a bypass capacitor 196 and to enable balancing of the quiescent push-pull direct current levels with a potentiometer 197. The threshold of the color killer circuit, which is included as part of the chroma amplifier 29, also is established by an adjustment of the potentiometer 197. The phase shift of 45° provided by the network 147 provides an off-quadrature direct current output signal from the ACC detector when the APC loop is locked to color burst.

Although the APC detector 40 and the ACC detector 47 are similar, if the ACC detector were fabricated in the same configuration as the APC detector 40, it would be necessary to employ an additional bonding pad for the phase adjustment which then would be comparable to the phase adjustment which is made acorss the bonding pads 102 and 103 in the APC detector. The circuit employed for the APC detector 40 is used since it has a common mode drift with variations in supply voltage and temperature, whereas the ACC circuit 47 is subject to some differential drift with variations in ambient temperature and supply voltage. Compensation for the temperature drift is provided in part by an additional emitter follower transistor 199 connected in the base circuit of transistor 191 to match the transistor 193 in the base circuit of the transistor 190. The slight differential drift which can occur with respect to variations in the DC supply in the ACC circuit 47 is not critical for the ACC circuit to the extent that it would be for the APC circuit, so the circuit configuration shown for the ACC circuit 47 is preferred since it requires one less bonding pad for the control function than does the circuit of the APC detector 40.

It should be noted that the circuit 30 does not require external phase shifting circuits utilizing inductors or a large number of capacitors. The external control circuit for the gated burst amplifier and DC hue control circuit is a simple potentiometer, with the necessary phase shifting functions taking place within the integrated circuit processing chip itself. Similarly, the phase shifting functions for the oscillator are provided on the processing circuit chip itself. All of the control functions for the APC detector take place in the simple resistor-capacitance network connected between the bonding pads 102 and 103, and a single bonding pad is used for AC bypass and balance adjusment of the ACC circuit.

I claim:

1. A signal processing circuit including in combination:

first differential amplifier means comprising first and second amplifier devices each having first, second and control electrodes, with the first electrodes thereof coupled with a first common terminal;

means for applying an input signal to the control electrode of at least one of said first and second amplifier devices;

at least one additional differential amplifier means comprising third and fourth amplifier devices each having first, second and control electrodes, with the first electrodes of said third and fourth amplifier devices being coupled in common with the second electrode of said first amplifier device;

reactance means coupled in circuit between the second electrode of said second amplifier device and the second electrode of one of said third and fourth amplifier devices;

control means coupled with the control electrode of at least one of said third and fourth amplifier devices for applying a control potential thereto to vary the relative gains of said third and fourth amplifier devices; and output means coupled with the second electrode of at least one of said second, third and fourth amplifier devices for providing an output signal having a predetermined phase relationship with respect to the phase of said input signal.

2. The combination according to claim 1 further including shunt gate means connected across the first and second electrodes of said first and second amplifier devices and rendered conductive and nonconductive in response to a gating signal; and means for applying gating signals to said shunt gate means.

3. The combination according to claim 1 wherein said signal processing circuit is fabricated as a monolithic integrated circuit.

4. The combination according to claim 1 including first and second voltage supply terminals for connection across a direct current supply voltage and means for coupling the second electrodes of said second, third and fourth amplifier devices with said first voltage supply terminal and means for coupling the first common terminal with said second voltage supply terminal.

5. The combination according to claim 4 wherein said reactance means is capacitive means and further including first and second load resistors, the resistance of said first load resistor being substantially twice the resistance of said second load resistor, said first load resistor coupled between the second electrode of said second amplifier device and said first voltage supply terminal, said second load resistor coupled between the second electrode of said fourth amplifier device and said first supply terminal, wherein the second electrode of said third amplifier device is coupled directly with said first voltage supply terminal; and said capacitive means is coupled between the second electrodes of said second and fourth amplifier devices.

6. The combination according to claim 5 wherein said means for coupling the first common terminal with said second voltage supply terminal comprises current source means.

7. The combination according to claim 1 wherein said control means comprises a differential direct current voltage source coupled across the control electrode of said third and fourth amplifier devices.

8. The combination according to claim 7 wherein said differential direct current voltage source comprises a phase comparator circuit having first and second input circuits for receiving first and second alternating current signals to be compared and having first and second outputs coupled with the control electrodes of said third and fourth amplifier devices, respectively, with differential direct current voltage levels being developed on said first and second outputs in accordance with the phase relationship of input signals applied to the first and second inputs thereof.

9. The combination according to claim 8 wherein the signal applied to the first imput of said phase comparator comprises said output signal provided by said output means.

10. The combination according to claim 1 further including a third differential amplifier circuit means comprising fifth and sixth amplifier devices, each having first, second and control electrodes, with the first electrodes thereof coupled in common with the second electrode of said second amplifier device, the control electrodes of said fourth and fifth amplifier devices coupled together at a second common terminal and the control electrodes of said third and sixth amplifier devices coupled together at a third common terminal; means interconnecting the second electrodes of said third and fifth amplifier devices; and means interconnecting the second electrodes of said fourth and sixth amplifier devices.

11. The combination according to claim 10 wherein said control means comprises a differential direct current voltage source connected across the second and third common terminals for differentially varying the gain of said third and fourth amplifier devices and for differentially varying the gain of said fifth and sixth amplifier devices.

12. The combination according to claim 11 wherein said differential direct current voltage course comprises a phase comparator circuit having first and second input circuits for receiving first and second alternating current input signals to be compared and having first and second outputs coupled, respectively, to the second and third common terminals, a differential direct current voltage being developed across the first and second outputs in accordance with the relationship of input signals applied to the first and second inputs thereof.

13. The combination according to claim 10 wherein said reactance means is capacitive means and further including first and second voltage supply terminals, current source means coupling the first common terminal with said second voltage supply terminal, first and second resistance means coupled together at a first junction and connected in series between the second electrode of said third amplifier device and said voltage supply terminal; third and fourth resistance means coupled together at a second junction and connected in series between the second electrode of said fourth amplifier device and said first voltage supply terminal, said second electrodes of said fifth and sixth amplifier devices connected respectively to said first and second junctions; and wherein said capacitance means is connected between the second electrodes of said third and fourth amplifier devices.

14. The combination according to claim 13 further including means for connecting frequency determining means between the second electrode of one of said third, fourth, fifth and sixth amplifier devices and the control electrode of one of said first and second amplifier devices.

15. The combination according to claim 14 wherein said means for connecting frequency determining means is coupled between the second electrode of said fourth amplifier device and the control electrode of said second amplifier device.

16. The combination according to claim 15 wherein said control means comprises a differential direct current voltage source connected across the second and third common terminals.

17. The combination according to claim 16 further including means for providing a reference signal and wherein said differential direct current voltage source comprises a phase comparator circuit having first and second input circuits, with the first input circuit coupled with said output means to receive said output signal and the second input circuit coupled with said means for providing a reference signal, said phase comparator having first and second outputs coupled respectively with the second and third common terminals.

18. The combination according to claim 16 further including shunt gate means for enabling and disabling said phase comparator circuit in response to gating signals, and means for applying gating signals to said shunt gate means.

19. A signal processing circuit including in combination:

first differential amplifier means comprising first and second amplifier devices each having first, second and control electrodes, with the first electrodes thereof coupled with a first common terminal;

means for applying a first alternating current input signal to the control electrode of at least one of said first and second amplifier devices;

means for applying a second alternating current input signal to said first common terminal;

at least one additional differential amplifier means comprising third and fourth amplifier devices each having first, second and control electrodes with the first electrodes of said third and fourth amplifier devices being coupled at a common current node, the second electrode of said first amplifier device coupled with the control electrode of said third amplifier device;

a fifth amplifier device having first, second and control electrodes, with the control electrode of said fifth amplifier device coupled with the second electrode of said fourth amplifier device and the first electrode of said fifth amplifier device coupled with the control electrode of said fourth amplifier device;

coupling means coupling the second electrodes of at least said second, third, fourth and fifth amplifier devices with a source of operating potential;

output means coupled with the second electrode of said third amplifier device for providing an output signal from said processing circuit; and means coupled with the control electrode of said third amplifier device for providing a variable control potential thereto.

20. The combination according to claim 19 further including a gating amplifier device having first, second and control electrodes, with the first and second electrodes thereof coupled between the first common terminal and said coupling means, said gating amplifier device being normally conductive to render said signal processing circuit non-responsive to said first and second alternating current input signals and being rendered nonconductive in response to a gate pulse applied to the control electrode thereof to render said signal processing circuit responsive to said first and second input signals; and means for applying a gate pulse to the control electrode of said gating amplifier device.

* * * * *